United States Patent [19]

Tselesin

[11] Patent Number: 5,380,390
[45] Date of Patent: Jan. 10, 1995

[54] PATTERNED ABRASIVE MATERIAL AND METHOD

[75] Inventor: Naum N. Tselesin, Atlanta, Ga.

[73] Assignee: Ultimate Abrasive Systems, Inc., Atlanta, Ga.

[21] Appl. No.: 66,475

[22] Filed: May 25, 1993

Related U.S. Application Data

[63] Continuation-in-part of Ser. No. 712,989, Jun. 10, 1991, abandoned.

[51] Int. Cl.$^6$ .................................................. B44C 1/165
[52] U.S. Cl. ............................................ 156/230; 156/89; 156/276; 156/279; 51/300; 51/309; 428/307.7; 428/908.8; 428/313.9; 428/314.4; 428/317.1; 428/312.6; 428/312.8; 428/319.1; 428/698; 428/699
[58] Field of Search ............... 156/89, 276, 279, 230; 51/295, 296, 297, 298, 300, 307, 308, 309; 428/307.3, 307.7, 908.8, 313.9, 313.3, 314.4, 317.1, 311.3, 312.2, 312.6, 312.8, 318.6, 319.1, 688, 689, 698, 699

[56] References Cited

U.S. PATENT DOCUMENTS

| | | | |
|---|---|---|---|
| 3,565,713 | 2/1971 | Van Wagner | 156/89 |
| 3,663,191 | 5/1972 | Kroder | 51/309 |
| 3,745,623 | 7/1973 | Wentorf | 29/95 B |
| 3,773,480 | 11/1973 | Hall | 51/295 |
| 4,292,103 | 9/1981 | Namura et al. | 156/230 |
| 4,366,202 | 12/1982 | Borovsky | 428/283 |
| 4,411,856 | 10/1983 | Montierth | 264/267 |
| 4,510,000 | 4/1985 | Kumar et al. | 156/89 |
| 4,520,062 | 5/1985 | Ungaw et al. | 156/230 |
| 4,560,603 | 12/1985 | Giacomel | 428/86 |
| 4,680,199 | 7/1987 | Voutell | 427/199 |
| 4,759,892 | 7/1988 | Bonzo | 264/251 |
| 4,781,775 | 11/1988 | Reed | 156/89 |
| 4,825,539 | 5/1989 | Nagashima | 29/848 |
| 4,846,906 | 7/1989 | Helferich | 156/89 |
| 4,889,760 | 12/1989 | Kippenberg | 156/89 |
| 4,906,512 | 3/1990 | Roess | 156/89 |
| 4,916,869 | 4/1990 | Oliver | 51/293 |
| 4,931,069 | 6/1990 | Wiand | 51/293 |
| 4,949,511 | 8/1990 | Endo | 51/295 |
| 4,951,427 | 8/1990 | St. Pierre | 51/293 |
| 5,014,468 | 5/1991 | Ravipati | 51/309 |
| 5,021,204 | 6/1991 | Frost | 156/89 |
| 5,049,164 | 9/1991 | Horton | 51/295 |
| 5,049,165 | 9/1991 | Tselesin | 51/295 |
| 5,066,312 | 11/1991 | Ishak | 51/309 |
| 5,092,910 | 3/1992 | dekok | 51/295 |
| 5,110,384 | 5/1992 | Dudek | 156/89 |
| 5,131,924 | 7/1992 | Wiand | 51/309 |
| 5,145,739 | 9/1992 | Sarin | 51/295 |
| 5,152,917 | 10/1992 | Pieper | 51/309 |
| 5,164,265 | 11/1992 | Stubbs | 428/421 |
| 5,181,939 | 1/1993 | Nett | 51/295 |
| 5,200,051 | 4/1993 | Cozzette | 204/403 |
| 5,203,880 | 4/1993 | Tselesin | 51/307 |
| 5,213,590 | 5/1993 | Nett | 51/293 |
| 5,213,591 | 5/1993 | Celikkaya | 51/293 |
| 5,219,462 | 6/1993 | Bruxroort | 51/293 |
| 5,234,757 | 8/1993 | Wong | 428/311.1 |
| 5,288,353 | 2/1994 | Revankar | 156/230 |

FOREIGN PATENT DOCUMENTS

63-270403  11/1988  Japan ............................ 156/89

Primary Examiner—W. Gary Jones
Assistant Examiner—Mark De Simmone
Attorney, Agent, or Firm—Finnegan, Henderson, Farabow, Garrett & Dunner

[57] ABSTRACT

An abrasive material is formed by coating a substrate with an adhesive, contacting he substrate with a quantity of hard, abrasive particles, then removing all particles not held by the adhesive. The remaining particles are surrounded with a sinterable or fusible material while the particles are temporarily held. The substrate can have the adhesive applied in a pattern, or covering uniformly and masked, to cause particles to adhere in certain areas to achieve a desired pattern. While the particles are held on the substrate, physical force can be applied to orient the particles uniformly; then, a powder can be applied, or the substrate can be applied to a preform. Subsequent treatment with heat and/or pressure will complete the abrasive material.

18 Claims, 2 Drawing Sheets

PATTERNED ABRASIVE MATERIAL AND METHOD

CROSS-REFERENCE TO RELATED APPLICATIONS

This application is a continuation-in-part of the application by the same inventor, Ser. No. 07/712,989, filed Jun. 10, 1991, now abandoned and titled "Patterned Abrasive Material and Method".

BACKGROUND OF THE INVENTION

1. Field of the Invention

This invention relates generally to abrasive materials, and is more particularly concerned with a method for making a patterned abrasive materials wherein a plurality of abrasive particles is temporarily held by an adhesive, and is subsequently fixed by a matrix material.

2. Discussion of the Prior Art

Much effort has been expended in attempting to place diamonds or other hard abrasive particles on a surface in a predetermined pattern. The pattern is desirable in that the hard particles are distributed substantially uniformly throughout a surface, or in that specific shapes containing generally uniformly distributed particles are distributed throughout a surface. By having the particles in specific shapes that are distributed across a surface, the stock removal rate, and the quality of the machined surface, can be optimized; and, more importantly, spaces between the abrasive areas allow for the removal of debris and the inflow of coolant.

Most of the prior art techniques for providing patterns of abrasive particles include the provision of metal spots onto which diamonds are electrodeposited, the diamonds then being held in place by electroplating, or by a polymeric resin or the like. Diamonds have also been hand placed to achieve a pattern. Hand setting is of course very time consuming; and, the particles have then been held in place by electrodeposition of metal to hold the particles. Holding the particles by electrodeposited metal is not fully satisfactory because insufficient metal can be provided to truly hold the particles and to resist wear; thus, the particles tend to come loose before the abrasive material has been used enough to wear the particles. Once one stone, or particle, is loosened, there is less support for adjacent particles, and one is likely to lose a number of additional particles very quickly. In addition, not all hard particles can be held by electrodeposited metal; and, electrodepositing is limited in its range of metallic compositions as not all metals are capable of electrode position. Electrodepositing is not feasible with non-metallic compositions. Further, electrodepositing presents some environmental problems related to disposing of the used electrolytes.

Another prior art technique is disclosed in French application No. 69.01577 filed Jan. 24, 1969, and published under No. 2,029,390. In this application, abrasive particles are deposited into the openings in mesh material of wire, plastic or the like. While the abrasive particles reside in the openings in the mesh, metal is electroplated to secure the particles within the mesh. In one embodiment, the particles are forced into the openings in the mesh, and the mesh holds the particles until metal is electroplated thereon to secure the particles. To use this invention, therefore, one must select the size of the abrasive particles carefully; then, the electroplating does not provide sufficient strength for the resulting material to be very durable. This method is difficult to implement on a mass-production scale because the particles are not secured within the openings until metal is electrodeposited on the material, so the material would be difficult to transport before the metal is deposited.

One successful technique for providing patterns in the abrasive material is disclosed in U.S. Pat. Nos. 4,925,457, issued May 15, 1990, 5,049,165, issued Sep. 17, 1991, and 5,092,910, issued Mar. 3, 1992. This technique provides single and multiple layer sintered abrasive material that can subsequently be cut to shape and fixed to a substrate. Use of sinterable material, preferably processed with pressure during sintering, allows one to provide the abrasive tool with a desired combination of strength, flexibility, toughness, wear resistance, and good adherence to metallic mesh and to a variety of abrasive particles such as diamonds and cubic boron nitrides, for structural integrity. Because of this, very demanding applications can be satisfied, such as saw segments for cutting concrete, ceramic and stone, for stock removal members of grinding tools, and drill bit segments for the same materials. These materials and tool are used for such heavy duty applications as dry cutting. Electrodeposited metal does not have these advantages. If desired, of course, a plurality of specific shapes can be spaced apart on a substrate to achieve a patterned abrasive. The resulting patterned abrasive is a good quality abrasive, but the additional steps of preparing the abrasive, transporting the prepared abrasives within a manufacturing facility or between manufacturing facilities, and subsequently assembling the patterned abrasive renders the technique uneconomical for mass production of the abrasive material, and for some applications.

SUMMARY OF THE INVENTION

The present invention provides a method for making an abrasive material wherein a tacky adhesive is provided on a substrate. Hard abrasive particles are then placed into contact with the substrate, and the adhesive temporarily holds some of the hard particles on the substrate. A mask, which may take the form of a mesh or other cellular material, can be placed against the substrate before contacting the substrate with hard particles. The mask will then determine the distribution of the hard particles; and, the hard particles may be received within the openings of a mesh or other cellular material. Alternatively, the adhesive may be applied in a pattern on the substrate to determine the distribution of the hard particles.

After the hard particles have been placed on and adhered to the substrate, a matrix material is engaged with the hard particles and/or the substrate. The matrix material thus provides a composite abrasive material wherein the particles are in the desired pattern and held by the matrix material.

BRIEF DESCRIPTION OF THE DRAWINGS

These and other features and advantages of the present invention will become apparent form consideration of the following specification when taken in conjunction with the accompanying drawings in which.

DETAILED DESCRIPTION OF HE EMBODIMENTS

Figure 1:
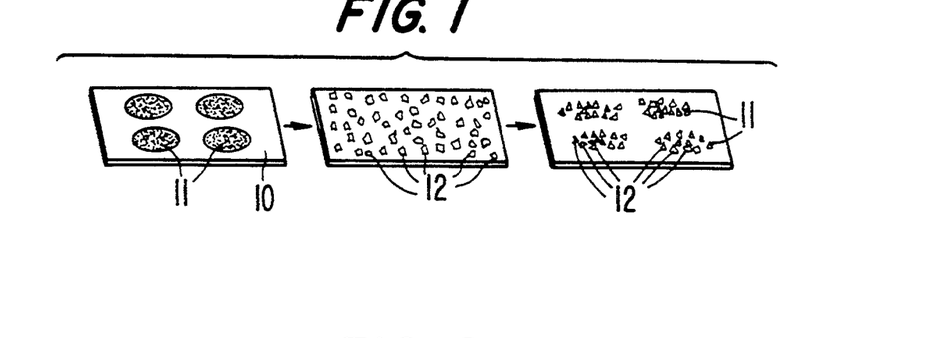
FIG. 1 is a rather schematic, perspective view showing one method for preparing an abrasive product in accordance with the present invention.

Referring now more particularly to the drawings and to those embodiments of the invention here chosen by way of illustration, FIG. 1 shows one technique for applying hard, abrasive particles to a substrate. The substrate 10 may be almost any material, such as: a thin sheet of metal plastic or paper; or a preform consisting of unsintered, partially sintered or completely sintered metal powder, metal fibers or the like. In general, almost any substance may be used as the substrate 10, including a substrate made by vapor deposition, by thermal spraying such as plasma spraying, or the like.

The first step in FIG. 1 shows the substrate 10 with a plurality of adhesive areas 11 defined thereon. The adhesive areas 11 may be formed in any ay desired. For example, the surface of the substrate 10 can be masked as by a stencil, and the areas sprayed, poured or the like. Also, the areas 11 may be pieces of pressure sensitive tape. Thus, any means for rendering the areas 11 tacky is within the scope of the present invention.

Brazing, or fusing, paste can be advantageously used as the adhesive in the present invention. The paste is available with and without flux. The paste is commercially available, and can also be custom made to suit individual preferences. Such a paste therefore will provide the adhesive, and a fusible material at the same time. It should also be understood, of course, that such a paste may contain sinterable material rather than a fusible material, or may contain both fusible and sinterable materials.

The second step in FIG. 1 then shows the substrate 10 contacted by a plurality of hard particles, the idea being to cover the entire substrate with the particles. Then, the substrate is inverted or otherwise treated to remove loose particles from the substrate. While particles 12 cover the entire substrate 10 in step two, step three shows particles 12 remaining only in the tacky areas 11. The material is thus ready to receive a matrix material to secure the particles 12 permanently.

Figure 2:
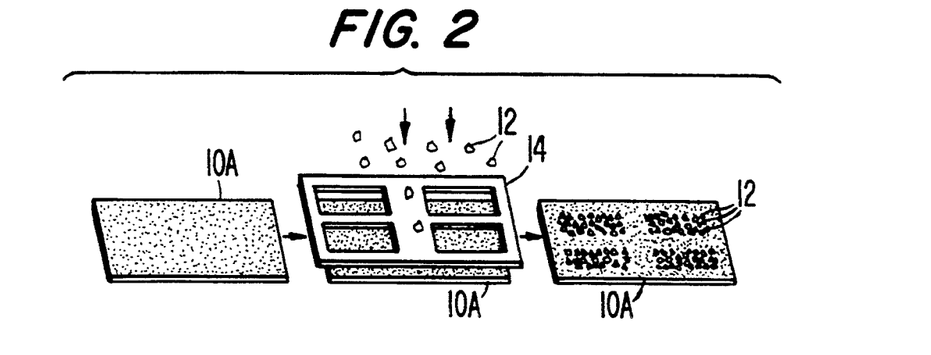
FIG. 2 is a view similar to FIG. 1, but showing a slightly modified process.

FIG. 2 shows a modification of the method illustrated in FIG. 1. In FIG. 2, the entire substrate 10A is coated with adhesive. Since the entire surface is coated, it will be understood that the adhesive may be sprayed, rolled, brushed or the like, or the substrate may be dipped, or tapes having adhesive thereon may be used. By some technique, then, the surface of the substrate 10A is coated with a tacky adhesive.

The second step is to place a mask against the surface of the substrate 10A, then to place a plurality of hard particles against the surface. As illustrated in FIG. 2, the mask 14 has relatively large opening through which the particles 12 will pass to create areas of particles adhered to the substrate 10A. The mask 14 can then be removed, as shown in step three of FIG. 2, and there remains a substrate with a plurality of discrete areas, each having a plurality of particles temporarily adhered thereto.

Several variations in this method are possible. As will be discussed below, the mask may be a wire mesh or the like, and the mask may be left in place to become a part of the final abrasive material. With this in mind, adhesive can be applied to the mask after the mask is in place and before the hard particles are engaged with the surface. The mask will retain some particles on its surface in addition to the particles retained within the openings of the mask. ALso, the particles can be placed on the surface; then, adhesive can be applied to the entire surface, and more hard particles added. A greater quantity of hard particles will now be retained, and some of the particles will be fixed to the mask.

The present invention readily lends itself to the orientation of hard particles before the particles are permanently secured. Using mechanical forces, such as by shaking or vibrating the substrate with the hard particles temporarily fixed by adhesive, or loose on the substrate, the particles will be forced into a position that is stable. By applying magnetic force, the particles such as diamonds will become oriented according to their crystallographic structure and the lines of magnetic force. Thus, many different physical forces may be applied to the substrate having hard particles thereon, and the particles will be uniformly oriented.

Once the particles are oriented, they must be held securely in order to obtain the advantages of the orientation. After the particles have been oriented, therefore, the group of particles may be sprayed with a coating of an adhesive to hold the positions. Also, one can wet the particles with a liquid such as water, then freeze the liquid to hold the particles. In any event, one will contact he particles with a sinterable or fusible material, perhaps in a preform, to provide a permanent hold for the particles.

Figure 3:
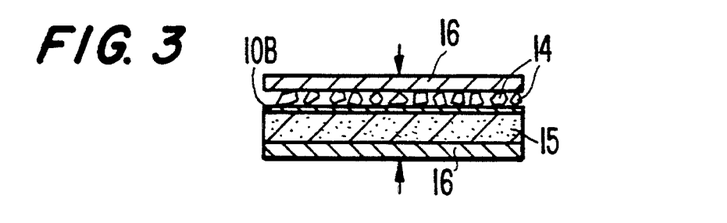
FIG. 3 is an enlarged, cross-sectional view showing the material from FIG. 1 or FIG. 2 being fixed by matrix material in accordance with the present invention.

Attention is next directed to FIG. 3 of the drawings which shows one method for securing the particles with a matrix material. In FIG. 3 there is a substrate 10B which may be any material as is discussed above. It should further be noticed that the substrate 10B may be a tape or the like having adhesive on both sides. The tape can then be stuck to the preform 15, and receive particles 14 on the otter surface. The substrate 10B may also be a more nearly rigid material that is subsequently placed against the preform 15. In any event, the substrate 10B is placed against the preform 15, and pressure is exerted by the opposed plates 16.

When pressure is exerted on the assembly shown in FIG. 3, the particles 14 will be urged into the preform. One might force the particles 14 completely into the preform so the particles are totally surrounded by the matrix material, or one might leave a portion of the particles protruding from the preform. This is a matter of design choice depending on the particular use of the resulting abrasive material.

Those skilled in the art will understand that the preform 15 may be any of numerous types of preform. First, it should be pointed out that the preform may be a sinterable or a fusible material, or a combination thereof, depending on the specific results desired. Those skilled in the art will understand that the process and the function, in this context, is substantially the same whether the matrix material is sinterable or fusible. The final strength is different, but those skilled in the art will select the particular matrix material that is best for the intended use. Therefore, as used herein, each of the terms "sinterable" and "fusible" will also include the other unless the context requires otherwise. Further-more, it will be understood that a matrix material can be deposited by a temperature related process such as thermal (e.g. plasma) spray or vapor deposition. In the context of the present invention, such thermal deposition of material can be considered as an equivalent of the use of sinterable material.

In addition to the sinterable and fusible matrix materials, it will be understood that metal can be electrodeposited to provide a temporary hold for the particles. In this case an electroconductive adhesive can be used. Those skilled in the art will realize that the matrix provided by electrodeposition will not be as strong as sintered or fused matrix material.

Looking next at FIG. 4 of the drawings, it will be seen that this is an arrangement utilizing the method discussed in connection with FIG. 2 in that a mask is placed against the substrate, and particles adhere to the exposed substrate.

Figure 4:
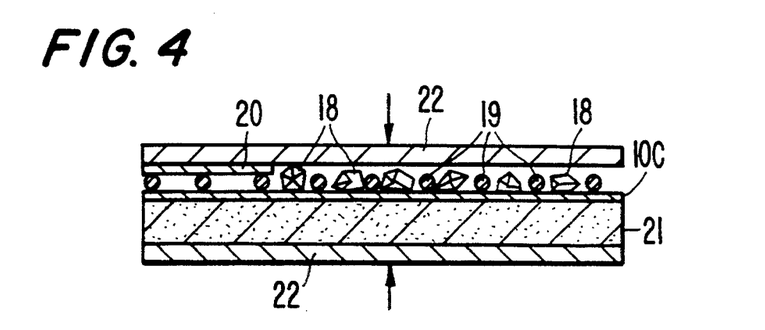
FIG. 4 is an enlarged, cross-sectional view showing a modified form of the arrangement shown in FIG. 3.

As shown in FIG. 4, the substrate 10C has an adhesive as has been previously discussed. The mask takes the form of a wire mesh 19. While the openings in the mask of FIG. 2 are large enough that a large number of particles 12 enter each opening, the openings in FIG. 4 are such that a single particle 18 is in each opening. This is a matter of design choice, and any ratio of opening size to particle size may be selected.

Another feature shown in FIG. 4 is the blocking, or shielding, of a portion of the mask 19. Some form of shield 20 can be used to cover a portion of the mesh 19 and adhesive to prevent particles 18 from adhering in this area. Though numerous materials and techniques can be used, if one is using a pressure sensitive tape as the substrate 10C, the same tape can be used as the shield 20, so the complete mask is easy to assemble.

FIG. 4 shows an arrangement similar to FIG. 3 in that the substrate 10C, with the temporarily adhered particles 18, is placed against a preform 21, and plates 22 then exert pressure on the assembly. A difference in FIG. 4 is that the mask, in the form of the mesh 19, remains in place to be forced into the preform. The mesh 19 may be a steel or other relatively high melting point metal, in which case the mesh will assist in supporting the particles 18 during use of the resulting abrasive material; or, the mesh 19 may be a polymeric material or the like having a low melt (or even vaporization) point, in which case the mesh will effectively disappear from the completed abrasive material.

As before, the particles 18 can be forced completely into the preform 21, or the particles may be partially protruding from the preform to have an "open" surface immediately.

Using the process of the present invention, the ratio of the size of the mesh opening to the size of the hard particles is not important. During the compaction of the material, the particles can be separated by the matrix material so that substantially all the particles can be substantially completely surrounded by matrix material and are not directly in contact with wires of the mesh material.

Figure 5:
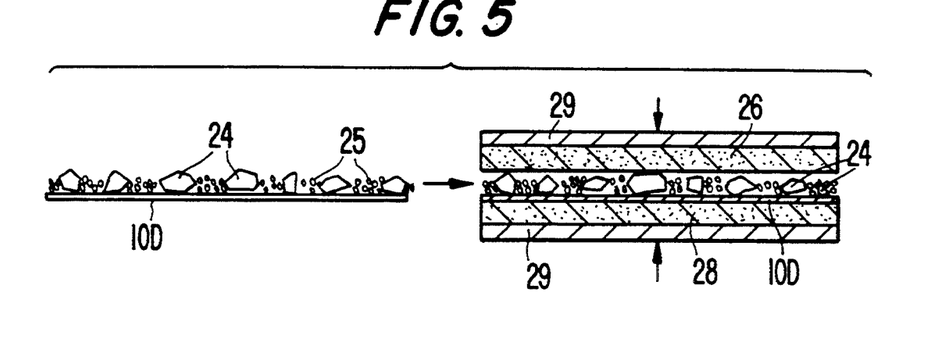
FIG. 5 is a schematic representation showing another method for fixing the particles in matrix material; and, FIGS. 6–8 are schematic views showing further modified methods for fixing the particles in matrix material.

FIG. 5 of the drawings illustrates another modification of the method discussed above. In FIG. 5, there is the substrate 10D which will have an adhesive on at least one surface. The surface may be masked as discussed above for the deposit of hard particles 24; then, the mask may be removed or not, as desired. In FIG. 5, the mask is not shown, but a mesh as in FIG. 4 may be used and left in place if desired. Then, a fusing material 25 is placed on the substrate. Since the hard particles 24 are already in place, the fusing material 25 will fill the interstices. A small number of pieces of material 25 is shown in FIG. 5, but those skilled in the art will understand that a relatively fine powder may be used, and the material 25 will largely surround each of the particles 24.

The substrate 10D therefore has hard particles 24 distributed thereon, and fusing material 25 at least partially surrounding the hard particles 24, all adhered to the substrate 10D by the adhesive on the substrate. This substrate is then placed against a preform. As shown in FIG. 5, the substrate is sandwiched between two preforms, though only one can be used if desired, as in FIG. 4.

Plates 29 will exert pressure on the assembly of FIG. 5, and heat will be applied. The fusing material 25 will melt at or below the sintering temperature of the preforms 26 and 28, and will assist in adhering the particles 24 to one another, and to the preforms 26 and 28. As a result, the abrasive tool can be stronger; or, one can use cheaper preforms because of the superior adhesion, without depreciating the quality of the final abrasive material. As i; well known in the art, if the hard particles 24 are buried under he surface of the matrix material, the working surface of the tool will be sand blasted or similarly treated to "open" the surface, or to expose the hard particles, before the first use.

In all of the above discussed methods, it should be understood that the substrate 10 can be virtually any material, and including a preform. A preform may be coated with adhesive to act as the substrate; then, the step of placing the substrate against a preform is not a separate step, but is merged with the step of placing hard particles on the substrate.

Further, one might start with any substrate, such as a piece of pressure sensitive tape, and deposit powder or fibers of matrix material thereon. The surface of the matrix material can then be coated with more adhesive, and the process repeated until a preform of the desired thickness is achieved. Adhesive can be the final layer, to receive and temporarily hold hard particles.

A sinterable preform with a high percentage porosity (e.g. 80% and above) can receive an adhesive substrate to seal one side of the preform. A fine, fusible powder is then poured into the preform to fill (at least partially) the pores of the preform. If desired, a second adhesive substrate can be used to seal the opposite side of the porous preform. The porous preform next receives a plurality of hard particles that are temporarily fixed to another adhesive substrate. A mesh or the like may also be adhered to this substrate. The substrates and preform are then placed together and sintered, with or without pressure. It will of course be understood that one may also provide a preform on top of the layer of hard particles, so the hard particles are between the two preforms.

The preform for use in the present invention may be also include a plurality of hard particles therein. For example, some diamonds, cubic boron nitrides, crushed hard metal such as cemented carbides, and ceramic pieces may be included and mixed with the metal powder or fibers of the preform. The preform may then be adhered with adhesive, partially sintered or sintered. The included hard particles will provide better resistance to abrasion to secure the hard particles 14, 19 or 24 and hold them more tenaciously.

By providing a preform with hard particles therein, one can then place a mesh material on at least one surface of the preform and apply compaction pressure. During compaction, some of the hard particles will be urged into some of the openings of the mesh material, thereby achieving a result similar to that described herein. While the abrasive material will not be as nearly homogeneous as the material formed by the other methods described herein, the technique is simple and could provide an inexpensive commercial product.

In all the above discussed embodiments of the invention, it will be understood by those skilled in the art that the materials may be impregnated with a fusible material. One will simply place a fusible material on at least one side of the assembly before beginning the heating and/or compaction, and the fusible material will melt and be carried into the material by capillary action.

Figure 6:
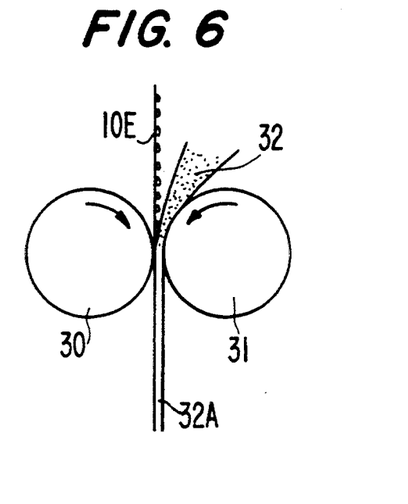
Figure 7:
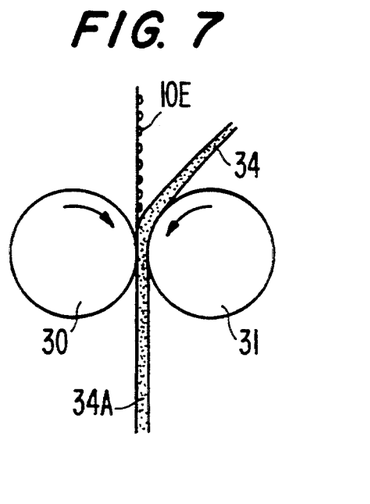
Figure 8:
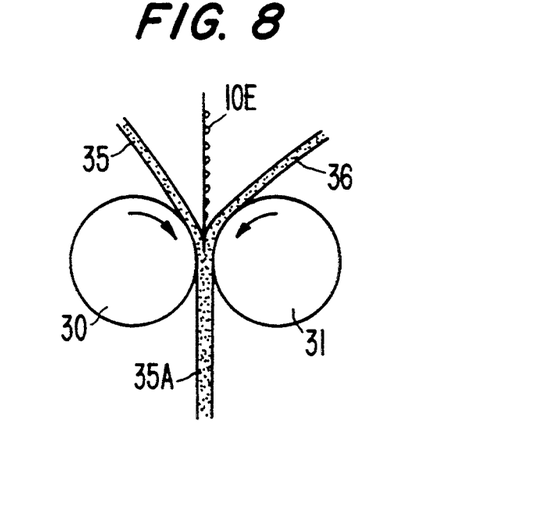

Looking now at FIGS. 6, 7 and 8, the above discussion of the methods should be kept in mind, and the compaction step is carried out by roll compaction. In FIGS. 6, 7 and 8 the apparatus is substantially the same, so all figures have the same reference numerals for similar parts.

In FIG. 6, a substrate 10E is fed between two rolls 30 and 31. The substrate 10E will be any of the substrates discussed above, with hard particles adhered thereto. To secure the particles in a matrix material, a metal powder or the like is added at 32. The assembly is compacted at the nip of the rolls 30 and 31 to produce the final product 32A. It should be understood that the powder 32 may be sinterable or fusible material, and may include hard particles as in discussed above.

FIG. 7 shows the substrate 10E passing between the rolls 30 and 31, and a preform 34 is placed against the substrate 10E. Pressure at the nip of the rolls 30 and 31 will provide the compaction step discussed to produce the final product at 34A. FIG. 8 is similar to FIG. 7 except that there are two preforms 35 and 36, one on each side of the substrate to produce a product similar to that produced by the method shown in FIG. 5. The product 35A exits from the nip of the rolls 30 and 31.

Thus, the method of the present invention is readily adapted to a continuous process for forming the abrasive material. A continuous strip of substrate, which may be pressure sensitive adhesive tape, or a preform or the like coated with adhesive can be fed between compaction rolls 30 and 31. Matrix material in the form of powder or fibers can be fed against the substrate, or a preform can be fed in against the substrate to form the final product. The substrate and the matrix materials can be selected to provide a final product with the desired features.

It will therefore be understood by those skilled in the art that the particular embodiments of the invention here presented are by way of illustration only, and are meant to be in no way restrictive; therefore, numerous changes and modification may be made, and the full use of equivalents resorted to, without departing from the spirit or scope of the invention as outlined in the appended claims.

I claim:

1. A method for making an abrasive material comprising the steps of coating a substrate with an adhesive, contacting said substrate with a first plurality of hard particles and then removing a second plurality of hard particles consisting of particles that are not adhered to said substrate by said adhesive so that a third plurality of hard particles remains on said substrate adhered to said substrate by said adhesive, and at least partially surrounding most of the particles of said third plurality of hard particles with a sinterable matrix material, and heating said material to cause said sinterable matrix material to permanently hold said third plurality of hard particles, wherein the said step of at least partially surrounding most of the hard particles with a sinterable matrix material includes the steps of sealing one side of a porous quantity of fusible powder into said porous preform, and placing together said porous preform and said substrate having said hard particles adhered to it prior to the said step of heating the material.

2. A method for making an abrasive material, said abrasive material comprising a plurality of hard particles for providing the abrasive quality, and a sinterable matrix material having the hard particles distributed therein for holding said hard particles, said method comprising the steps of placing a pressure sensitive adhesive tape against one side of a mask so that said pressure sensitive adhesive tape is adhered to said mask, said mask defining a plurality of openings distributed in a predetermined pattern, said openings extending completely through said mask so that said pressure sensitive adhesive tape closes said openings, then placing a quantity of hard particles against the opposite side of said mask so that some of said hard particles are received within said openings and at least some of said hard particles that are received within said openings are adhered to said pressure sensitive adhesive tape, removing hard particles that are not adhered to said pressure sensitive adhesive tape and subsequently at least partially surrounding said particles that are adhered to said pressure sensitive adhesive tape with a sinterable matrix material and heating said material to cause said material to hold said particles that adhere to said tape.

3. A method as claimed in claim 2 and further including the step of removing said mask from said pressure sensitive adhesive tape prior to the said step of at least partially surrounding said particles that are adhered to said tape with a sinterable matrix material.

4. A method as claimed in claim 3, and further including the step of applying a supplementary force to said hard particles that are adhered to said pressure sensitive adhesive tape before the said step of partially surrounding said particles with a sensitive matrix material.

5. A method as claimed in claim 4, wherein said supplementary force is selected from the group consisting of mechanical force and magnetic force.

6. A method as claimed in claim 2, and further including the step of applying a supplementary force to said hard particles that are adhered to said pressure sensitive adhesive tape for orienting said particles before the said step of partially surrounding said particles with a matrix material, and wherein said particles are of a size as to protrude from said openings in said mask.

7. A method as claimed in claim 6, wherein said supplementary force is selected from the group consisting of mechanical force and magnetic force.

8. A method as claimed in claim 3, including the step of applying a meltable material to said pressure sensitive adhesive tape after the said step of removing said mask from said pressure sensitive adhesive tape adhesive substrate, and before the said step of at least partially surrounding said particles that are adhered to said tape substrate with a sinterable matrix material.

9. A method as claimed in claim 8, wherein said meltable material is selected from the group consisting of fusible and brazable materials.

10. A method as claimed in claim 3, wherein said step of at least partially surrounding said particle that are adhered to said pressure sensitive adhesive tape with a sinterable matrix material includes the step of placing a sinterable preform against at least one side of said tape and urging said preform and said tape together.

11. A method as claimed in claim 2, wherein said step of at least partially surrounding said particles that are adhered to said pressure sensitive adhesive tape with a sinterable matrix material includes the step of placing a sinterable preform having hard particles randomly distributed therein against at least one side of said tape and urging said preform and said tape together.

12. A method as claimed in claim 2, wherein said step of at least partially surrounding said particles that are adhered to said pressure sensitive adhesive tape with a sinterable matrix material includes the step of placing a sinterable preform against at least one side of said tape and urging said preform and said tape together.

13. A method as claimed in claim 12, wherein said step of placing a preform against at least one side of said tape includes the steps of making said preform by coating a pressure sensitive adhesive tape with a sinterable matrix material to provide a first layer of a sinterable matrix material, and coating the surface of said sinterable matrix material with a adhesive applying a second sinterable matrix material layer, and repeating said steps until said preform of the desired thickness is formed.

14. A method as claimed in claim 2, wherein said mask is formed of a polymeric material, and further including the step of heating said material sufficiently that said mask effectively disappears from said material.

15. A method as claimed in claim 2, including the step of applying a meltable material to said pressure sensitive adhesive tape before the said step of at least partially surrounding said particles that are adhered to said pressure sensitive adhesive tape with a sinterable matrix material.

16. A method as claimed in claim 2, wherein said mask and said pressure sensitive adhesive tape are in the form of continuous strips, and wherein the said step of placing the pressure sensitive adhesive tape against one side of the mask is accomplished by feeding said continuous strips of mask and pressure sensitive adhesive tape between opposed compressing means.

17. A method as claimed in claim 16, wherein the said step of at least partially surrounding said hard particles that are adhered to said pressure sensitive adhesive tape with a sinterable matrix material comprises feeding a sinterable preform between compressing means along with said mask and pressure sensitive adhesive tape after having said hard particles applied to said openings in said mask.

18. A method as claimed in claim 2 wherein said hard particles are selected from the group consisting of diamonds, carbides, borides, nitrides, pieces of hard metals, and pieces of ceramic.

* * * * *

UNITED STATES PATENT AND TRADEMARK OFFICE
CERTIFICATE OF CORRECTION

PATENT NO. : 5,380,390
DATED : January 10, 1995
INVENTOR(S) : Naum N. Tselesin

It is certified that error appears in the above-indentified patent and that said Letters Patent is hereby corrected as shown below:

Claim 1, col. 8, line 7, before "quantity", insert --preform with a pressure sensitive adhesive tape, depositing a--.

Claim 4, col. 8, line 43, "sensitive" should read --sinterable--.

Claim 8, col. 8, lines 60-61, delete "adhesive substrate"; line 63, delete "substrate".

Claim 10, col. 8, line 68, "particle" should read --particles--.

Claim 13, col. 9, line 24, "a adhesive" should read --an adhesive,--.
Title page, item [57], col. 2,
Abstract, line 2, "he" should read --the--.

Signed and Sealed this

Eighteenth Day of April, 1995

Attest:

BRUCE LEHMAN

*Attesting Officer*  *Commissioner of Patents and Trademarks*

REEXAMINATION CERTIFICATE (3017th)
United States Patent [19]
Tselesin

[11] B1 5,380,390
[45] Certificate Issued Oct. 1, 1996

[54] PATTERNED ABRASIVE MATERIAL AND METHOD

[75] Inventor: Naum N. Tselesin, Atlanta, Ga.

[73] Assignee: Ultimate Abrasive Systems, Inc., Atlanta, Ga.

Reexamination Request:
No. 90/004,157, Feb. 29, 1996

Reexamination Certificate for:
Patent No.: 5,380,390
Issued: Jan. 10, 1995
Appl. No.: 66,475
Filed: May 25, 1993

Certificate of Correction issued Apr. 18, 1995.

Related U.S. Application Data

[63] Continuation-in-part of Ser. No. 712,989, Jun. 10, 1991, abandoned.

[51] Int. Cl.⁶ .................................................. B44C 1/165
[52] U.S. Cl. ........................ 156/230; 156/89; 156/276; 156/279; 51/300; 51/309; 428/307.7; 428/908.8; 428/313.9; 428/314.4; 428/317.1; 428/312.6; 428/312.8; 428/319.1; 428/698; 428/699
[58] Field of Search ............................ 156/89, 276, 278, 156/279, 230; 51/295, 296, 297, 298, 300, 307, 308, 309

[56] References Cited

U.S. PATENT DOCUMENTS

| | | | |
|---|---|---|---|
| 2,268,663 | 1/1942 | Kuzmick | 51/206 |
| 2,811,960 | 11/1957 | Fessel | 125/15 |
| 2,876,086 | 3/1959 | Raymond | 51/298 |
| 3,127,715 | 4/1964 | Christensen | 51/206 |
| 3,276,852 | 10/1966 | Lemelson | 51/298 |
| 3,860,400 | 1/1975 | Prowse et al. | 51/295 |

FOREIGN PATENT DOCUMENTS

| | | |
|---|---|---|
| 0086086 | 8/1983 | European Pat. Off. . |
| 0238434 | 9/1987 | European Pat. Off. . |
| 0294198 | 3/1994 | European Pat. Off. . |
| 2029390 | 10/1970 | France . |
| 2565870 | 12/1985 | France . |

*Primary Examiner*—David A. Simmons

[57] ABSTRACT

An abrasive material is formed by coating a substrate with an adhesive, contacting he substrate with a quantity of hard, abrasive particles, then removing all particles not held by the adhesive. The remaining particles are surrounded with a sinterable or fusible material while the particles are temporarily held. The substrate can have the adhesive applied in a pattern, or covering uniformly and masked, to cause particles to adhere in certain areas to achieve a desired pattern. While the particles are held on the substrate, physical force can be applied to orient the particles uniformly; then, a powder can be applied, or the substrate can be applied to a preform. Subsequent treatment with heat and/or pressure will complete the abrasive material.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *